United States Patent [19]
Uda et al.

[11] 4,101,297
[45] Jul. 18, 1978

[54] PROCESS FOR RECOVERING A SOLVENT VAPOR

[75] Inventors: Kazumi Uda, Fukuyama; Motohiko Tamura, Mihara; Ichiro Nishiura, Takehara; Hiroshi Fujiike, Mihara, all of Japan

[73] Assignee: Mitsubishi Jukogyo Kabushiki Kaisha, Tokyo, Japan

[21] Appl. No.: 759,263

[22] Filed: Jan. 14, 1977

Related U.S. Application Data

[63] Continuation-in-part of Ser. No. 732,074, Oct. 13, 1976, abandoned.

[30] Foreign Application Priority Data

Oct. 15, 1975 [JP] Japan .................... 50-124061

[51] Int. Cl.² .................. B01D 19/00; B01D 53/14
[52] U.S. Cl. .................................. 55/43; 55/48; 55/55; 55/88; 55/89
[58] Field of Search .............. 55/38, 43, 48, 55, 84, 55/88, 89

[56] References Cited

U.S. PATENT DOCUMENTS

| 3,217,466 | 11/1965 | Bogart | 55/48 X |
| 3,232,027 | 2/1966 | Lorenz et al. | 55/48 X |
| 3,323,289 | 6/1967 | Venemark | 55/84 X |
| 3,633,340 | 1/1972 | Illingworth | 55/84 |
| 3,861,890 | 1/1975 | Doncer et al. | 55/88 |
| 3,867,111 | 2/1975 | Knowles | 55/88 X |
| 3,907,524 | 9/1975 | Haines, Jr. | 55/88 |

FOREIGN PATENT DOCUMENTS

| 154,970 | 1/1951 | Australia | 55/73 |
| 266,311 | 6/1962 | Australia | 55/73 |
| 1,298,019 | 12/1962 | France | 55/43 |

OTHER PUBLICATIONS

"Absorption of Gases", v.m. Ramm. pp. 9–13, 655, 668, 671; 1966 (Moscow, USSR).

Primary Examiner—Charles N. Hart
Assistant Examiner—Robert H. Spitzer
Attorney, Agent, or Firm—Cushman, Darby & Cushman

[57] ABSTRACT

The present invention is a process for recovering solvent vapor which comprises absorbing solvent vapor in a first absorbing liquid, and subsequently stripping the solvent vapor to regenerate the first absorbing liquid. The stripped solvent vapor may be reabsorbed in a second absorbing liquid. The second absorbing liquid may be under greater than atmospheric pressure. Regenerating the first absorbing liquid may occur at pressures only slightly below atmospheric pressure, i.e., a low vacuum, by recycling the absorbing liquid to a regenerator. Because the regenerating process does not require the use of a high vacuum, the gas recovery apparatus may be more economically constructed and operated.

13 Claims, 2 Drawing Figures

PROCESS FOR RECOVERING A SOLVENT VAPOR

CROSS-REFERENCE TO RELATED APPLICATION

The present application is a continuation-in-part of our co-pending patent application Ser. No. 732,074 filed Oct. 13, 1976 and now abandoned, the entire specification and claims of which are hereby incorporated by reference.

BACKGROUND OF THE INVENTION

The term solvent recovery generally refers to a process in which a liquid is separated, purified and reused as a solvent. Some typical solvent-recovery processes are:

(1) The recovery of solvents vaporized in the drying of synthetic fibers and films, plastics and rubber products, smokeless powder, impregnated fabrics, adhesives, printing inks, paints, lacquers, enamels and other organic coatings;

(2) The recovery of solvents used in the solvent extraction of natural fats and oils or in other solid-liquid extractions;

(3) The recovery of solvents used in the solvent refining of mineral or vegetable oils in other liquid-liquid extractions, in extractive and azeotropic distillations or in gas-absorption processes;

(4) The recovery of solvents used for degreasing fabricated parts for dry cleaning or for other washing operations; and (5) The recovery of solvents used as mediums for chemical reactions or for the precipitation and crystallization of solids.

If an organic liquid is separated and purified, but not returned for reuse as a solvent, the operation cannot be strictly referred to as solvent recovery. However, except for the use to which the liquid is put, such operations may resemble solvent-recovery systems in every respect. Typical of such closely related processes are (1) the recovery of natural gasoline and light hydrocarbons from natural gas; (2) vapor recovery operations in petroleum refining; (3) the recovery of alcohol from fermentation gases; (4) the recovery of organic liquids from wood distillation and from coal tar distillation operations; and (5) the recovery of products or of unused reagents from chemical synthesis.

The growth of solvent-recovery systems has followed closely the growth of processes which manufacture and use organic solvents. While condensation of alcohol from vapor-laden air has been practiced since ancient times, some 99% of today's solvent recovery systems were put into operation after 1930. An excellent discussion of solvent recovery is found in Kirk-Othmer, *Encyclopedia of Chemical Technology, Second Edition*, Volume 18, pages 549–64 (1969), which is hereby incorporated by reference.

SUMMARY OF THE INVENTION

The present invention provides a method for recovering solvent vapor evaporating from a storage tank holding an organic solvent. More particularly, the present invention relates to a process for recovering an organic solvent by absorption, and regenerating the absorbing liquid without using a high vacuum system.

It is an object of the present invention to provide an economical process for recovering solvent vapor by absorption.

It is a further object of the present invention to provide an absorption process for recovering solvent vapor which regenerates the absorbing liquid without using high vacuum.

It is a further object of the present invention to provide an absorption process for recovering a solvent vapor which includes absorbing the solvent vapor in a first absorbing liquid, desorbing the solvent vapor without using high vacuum, and absorbing the solvent vapor again in a second absorbing liquid, which may be under greater than atmospheric pressure.

Yet another object of the present invention is to provide a process for separating and recovering two mixed solvent vapors which includes preferentially absorbing a first solvent vapor in a first absorbing liquid, desorbing and recovering the first solvent vapor without using high vacuum, and absorbing the second solvent vapor in a second absorbing liquid, and desorbing and recovering the second solvent vapor without using high vacuum.

Other objects of this invention will be apparent to those or ordinary skill in the art from a consideration of the entire specification and claims.

Surprisingly, it has been found that the objects of this invention can be achieved without using a high vacuum system by desorbing a portion of solvent vapor from a liquid in a regenerator under low vacuum, and recycling the liquid through the regenerator, liberating a portion of the solvent vapor at each cycle.

DETAILED DESCRIPTION OF THE INVENTION

The present invention is directed to a process for absorbing a solvent vapor in an absorbing liquid, subjecting the absorbing liquid to a reduced pressure to strip the solvent vapor therefrom, recovering the solvent vapor and reusing the absorbing liquid, all without using a high vacuum system. A prior process has been briefly described with respect to FIG. 1.

Figure 2:
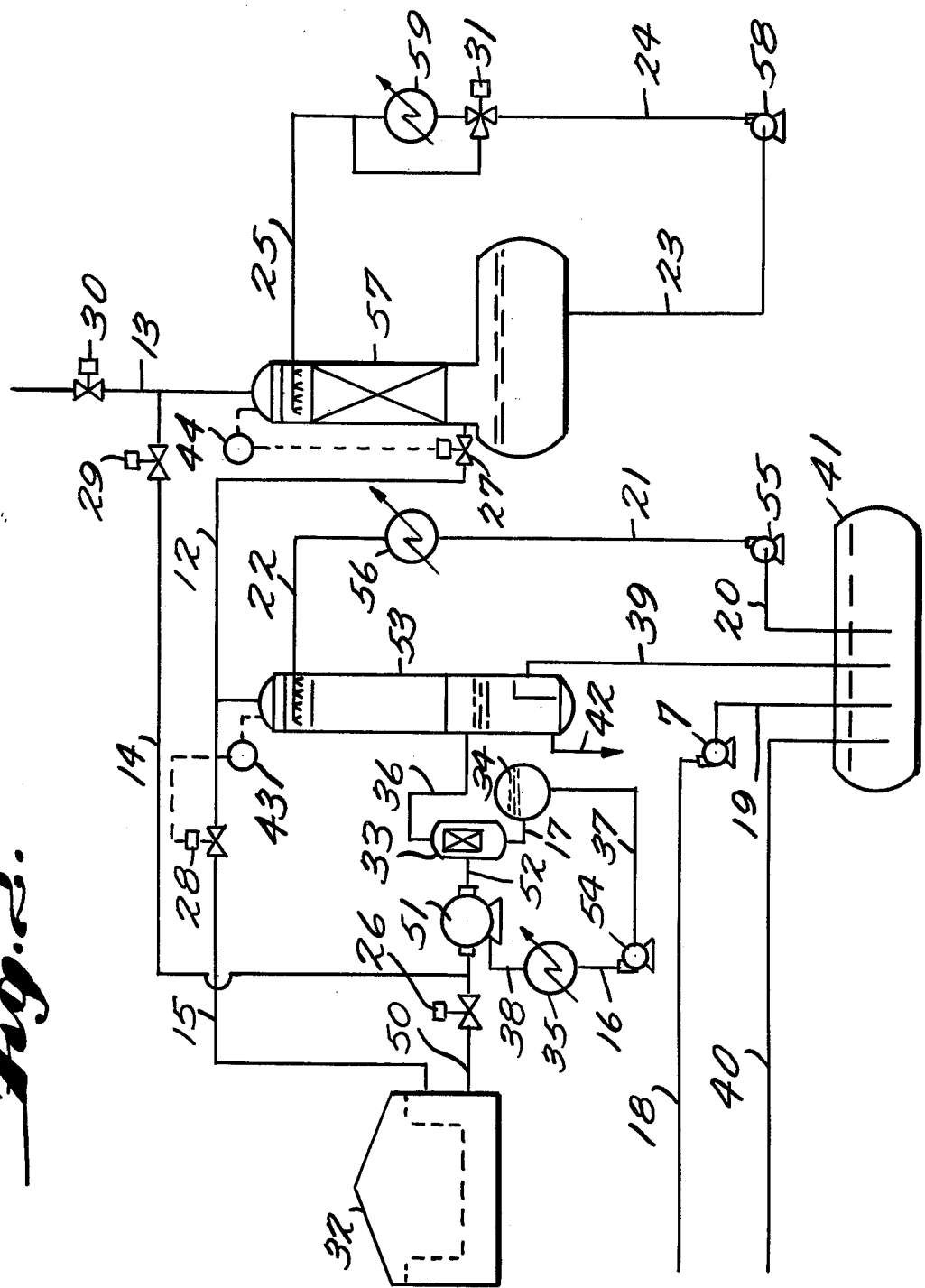
FIG. 2 shows the process of the present invention.

Turning now to FIG. 2, a mixed gas consisting of an organic solvent vapor and air in a storage tank is stored in reservoir 32. This mixed gas is forwarded to a water-sealing compressor 51, via pipe 50 and valve 26, and is compressed in a water-sealing compressor 51, the compression takes place without elevation of temperature (the temperature of the compressor being about 45° C.). Using a water-sealing compressor, it is possible to effect a safe cool compression and it is not necessary to use a saturator. A satisfactory compressor is disclosed in our copending United States application, Ser. No. 693,975, filed June 8, 1976, the specification and disclosure of which is hereby incorporated by reference.

The compressed mixed gas passes through a line 52 in a mixed gas-liquid phase together with sealing water into a separator 33. The mixed gas is separated from the sealing water in separator 33, and the mixed gas if forwarded to a first absorption column 53 by means of pipe 36. The first absorption column 53 comprises an upper absorption portion and a lower portion for separating organic solvent from water. The mixed gas from type 36 is brought into contact with a countercurrent liquid flow in the upper portion of absorption column 53. This liquid countercurrent flow is a flow of cool organic solvent which is a first absorbent descending from pipe 22 provided at the upper portion of the first absorption column 53. The cool organic solvent countercurrent flow absorbs most of the solvent vapor in the solvent vapor-air mixture entering the first absorption column. The cool organic solvent liquid countercurrent, enriched with absorbed solvent vapor, descends downwardly into the lower separator portion of the first absorption column 53.

The lower separator portion of the first absorption column 53 is maintained at a temperature slightly above the freezing point of water. The enriched cool organic solvent liquid is further cooled in the lower separator region to assist in the removal of any residual moisture present in the enriched organic solvent flow. The lower separator region of the first absorption column separates moisture from the enriched organic solvent flow thereby making use of the different specific gravity of water and organic solvent. The water is discharged outside of the reaction system by means of pipes 42. The dried enriched organic solvent flow is forwarded to a recovered solvent storage tank 41 by means of pipe 39. The liquid solvent stored in recovered solvent storage tank 41 is circulated through a pipe 20, a pump 55, a pipe 21, a cooler 56 and a pipe 22. From pipe 22, the cool solvent is again circulated as a countercurrent flow through the upper absorbing portion of the first absorption column 53.

Optionally, it is possible to recycle the dried enriched solvent from the first absorption column 53 via pipe 39 directly into pipe 20, without passing through recovered liquid solvent storage tank 41.

The volume of solvent in liquid solvent storage tanks 41 naturally increases during operation of the recovery system. In addition, the absorbing ability of the solvent gradually declines as it is recycled. Therefore, recovered solvent is periodically removed from the recovered liquid solvent storage tank 41 by means of discharge pipe 19, pump 7 and discharge 18. Fresh solvent is periodically supplied to the system via liquid solvent storage tank 41 from a pipe 40.

Sealing water separated from the mixed gas-liquid mixture in separator 33 passes through pipe 17, liquid surface control tanks 34, pipe 37, pipe 54, pipe 16, sealing water cooler 35 and pipe 38, returning into water sealing compressor 51.

Although most of the solvent vapor entering the upper portion of the first absorption column 53 is absorbed by the solvent countercurrent flow from pipe 22, nevertheless, a portion of the solvent vapor, mixed with air, passes through the top of the first absorption column 53, by means of pipe 12. Pipe 12 forwards this vapor to a second absorption column 57. The second absorption column 57 is in the form of a combination of an upper absorbing portion and a lower storage portion. In the upper absorbing portion, the vapor forwarded by means of pipe 12 and valve 27 is brought into contact with a counter current flow of a cooled solvent liquid, preferably a cooled, heavy hydrocarbon liquid which is supplied from pipe 25 at the upper portion of the second absorption column 57. By means of this heavy hydrocarbon liquid countercurrent flow, the solvent vapor not absorbed in the first absorption column 53 is substantially completely absorbed. Any unabsorbed solvent vapor, and air, passes through the top of the second absorption column 57 by means of pipe 13 and may be vented by means of valve 30, or recycled by means of valve 29 and pipe 14 returning to the water-sealing compressor 51.

The heavy hydrocarbon liquid countercurrent flow, having been enriched by absorbing solvent vapor, passes into the lower storage portion of the second absorption column. Therefrom it passes through pipe 23, pump 58, pipe 24, valve 31, cooler 59 and is recycled into the second absorption column by pipe 25. The operating temperature of the second absorption column should remain slightly above the freezing point of water, to avoid freezing moisture therein. The operating temperature of the second absorption column may be controlled by cooler 59.

The heavy hydrocarbon liquid counter current flow in the second absorption column continuously becomes more enriched as the liquid is recycled. The absorbing capacity of the heavy hydrocarbon liquid gradually declines as it becomes increasingly enriched. It is, therefore, necessary to regenerate the heavy hydrocarbon liquid from time to time.

Pressure control device 43 measures the pressure inside the first absorption column 53 and controls valve 28. The purpose of pressure control device 43 is to maintain the pressure in the first absorption column 53 above atmospheric pressure.

Pressure control device 44 controls the pressure inside the second absoption column 57. Pressure control device 44 measures the pressure inside the second absorption column and controls the degree of opening of valve 27. Valve 27 controls the supply of vapor transferred from the first absorbing column 53 to the second absorbing column 57.

In order to regenerate the heavy hydrocarbon liquid in the second absorbing column 57, the following procedure is used. Valves 26 and 27 are closed. Valves 28 and 29 are opened. Valve 30 is closed. At this time, because valve 27 is closed, no vapor can travel from the first absorption column 53 to the second absorption column 57. Water-sealing compressor 51 now functions as a low vacuum pump to draw gas from the top of the second absorption column 57, placing the second absorption column under a low vacuum. In accordance with the present invention, the low vacuum pressures contemplated are from about 560 mm Hg to about 160 mm Hg. Valve 31 is closed to bypass cooler 59 so that the heavy hydrocarbon liquid is not cooled as it is recycled through pipes 23, 24 and 25. Thus, the heavy hydrocarbon liquid recirculating through the second absorption column 57 gradually becomes warmer and it is placed under a low vacuum. Therefore, absorbed solvent vapor becomes less soluble in the heavy hydrocarbon liquid and is caused to evaporate therefrom. The solvent vapor leaving the heavy hydrocarbon liquid is transferred through pipes 13 and 14 and into the first absorption column 53. The pressure in the first absorption column 53 is maintained at greater than atmospheric pressure by pressure control device 43 and valve 28. The solvent vapor forwarded from the second absorption column 57, is absorbed into the cooled organic solvent in the first absorption column 53. Thus, in regenerating the heavy hydrocarbon liquid of the second absorption column 57, the first absorption column 53 recovers the solvent vapor liberated from the heavy hydrocarbon liquid. The solvent vapor not absorbed in the first absorption column may be returned to the reservoir 32 by pipes 15. To reduce the vacuum in the second absorption column 57, a portion of the vapor may be transferred through pipe 12 and valve 27 into the second absorption column 57. It is, of course, more economical to regenerate the heavy hydrocarbon liquid used in the second absorption column 57 with the minimum effective vacuum.

During normal operation of the solvent vapor recovery system valves 26 and 27 are open, valves 28 and 29 are closed and valves 30 and 31 are open. During normal operation, the water-sealing compressor 51 operates as a compressor, as described above.

Figure 1:
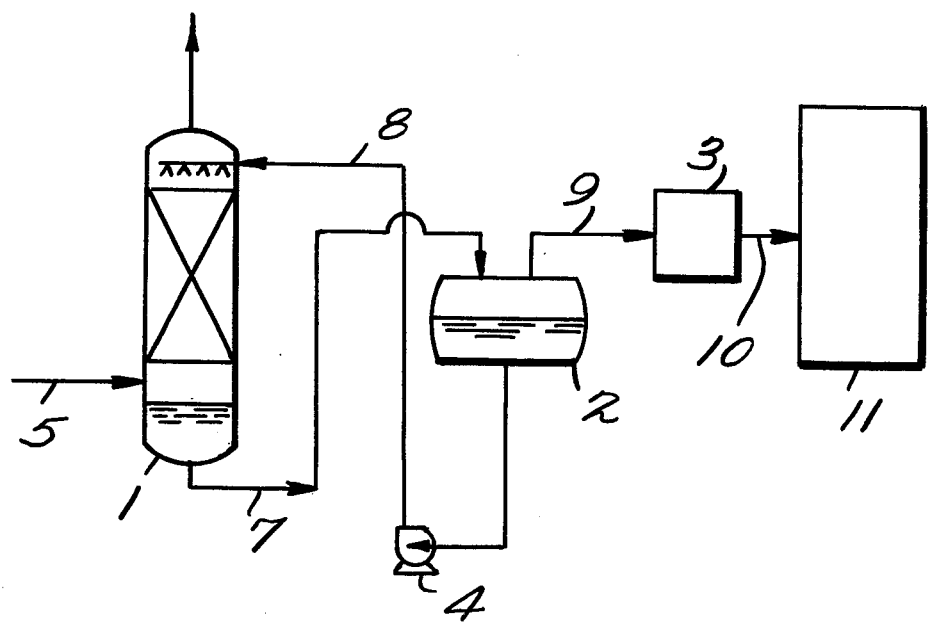
FIG. 1 shows a prior process in which a gas containing a solvent vapor enters an absorption column 1 from inlet pipe 5 and is brought into contact with an absorbing or scrubbing liquid, supplied from pipe 8. The vapor to be recovered is absorbed in the absorbing liquid and leaves the absorption column by means of outlet pipe 7. The absorbing liquid, enriched with the vapor to be recovered, enters flush tank 2 by means of outlet pipe 7. In flush tank 2 the vapor which was absorbed by the absorbing liquid is evaporated under high vacuum and passed through pipe 9 under the influence of high vacuum system 3. Passing through the high vacuum system the vapor to be recovered enters gas recovering apparatus 11 from pipe 10. Gas recovering apparatus 11 recovers the solvent vapor by any of the conventional methods, such as cooling, condensation, absorption or a combination thereof.

As mentioned above, the heavy hydrocarbon liquid in the second absorption column 57 may be generated under relatively low vacuum (i.e., only slightly below atmospheric pressure), by recycling the heavy hydrocarbon liquid until the desired removal of absorbed solvent vapors is achieved. By using this recycling technique, it is possible to achieve the same effect at relatively low vacuum as would otherwise require a high vacuum (i.e., very low pressure) with all of the disadvantages which are inherent in the high vacuum system. For example, a low vacuum system, as in the present invention, may use a one-stage vacuum pump whereas a high vacuum system would require a more complex two-stage pump. Further, less power is required to achieve a low vacuum and it is, therefore, more economical. Further, it is easier to construct a low vacuum system and to prevent leakage therein. A particularly significant advantage of the low vacuum system described is that the circulating pumps associated with a low vacuum system are far more simple and economical than circulating pumps associated with a high vacuum system. In this regard it is instructive to compare FIG. 1, pump 4 with FIG. 2, pump 55. FIG. 1 illustrates a high vacuum system. In such a high vacuum system absorbing liquid circulating pump 4 must be installed at a position lower than that of the vacuum pump 3. Furthermore, flush tank 2 must be positioned higher than vacuum pump 3. However, in a low vacuum system as illustrated in FIG. 2, the circulating pump and flush tank may assume any convenient position, thereby making a compact apparatus. All of these factors are significant in reducing the cost of constructing the apparatus, and cost of operating same.

Although the above-detailed explanation was a general process of recovering solvent vapor, it will be appreciated that the present invention is applicable to the recovery of solvent vapors in a wide variety of organic substances. The process of recovering solvent vapors of the present invention is particularly suitable for the recovery of gasoline vapor, jet fuel vapor, naphtha vapor, crude petroleum vapor, and other vapors of the hydrocarbon series. A wide variety of aromatic substances such as benzene, toluene and aliphatic solvents such as pentane, and hexane and cycloaliphatic solvents such as cyclopentane and cyclohexane may also be recovered by the process of the present invention. Further, the present invention is applicable to the recovery of solvent vapors of ketone solvents such as methylethyl ketone and methyl isobutyl ketone, as well as alcohols and esters useful as solvents. In using the solvent recovery system described, it is possible to separate two solvents. For example, a high vapor pressure solvent may be mixed with another solvent of substantially lower vapor pressure such as an aliphatic, aromatic or cycloaliphatic hydrocarbon. In such a case when the two-stage absorption process illustrated in FIG. 2 is performed, solvent vapor from the high vapor pressure solvent will be recovered in the first absorption column and the second solvent of substantially lower vapor pressure will be recovered in the second absorption column. As those in the art are aware, the higher the vapor pressure of a solvent, the more easily it is generally absorbed.

The process will be further illustrated by the following example, which is intended to be illustrative only and meant to include all techniques equivalent thereto.

EXAMPLE

1. Experimental data:
   1-1 Mixed gas

| | |
   |---|---|
   | Gasoline vapor | 35 mol % |
   | Air | 65 mol % |

1-2 Gasoline vapor recovering performance:

| | |
   |---|---|
   | a. Concentration of gasoline vapor at the entrance ($y_i$): | 35 mol %[*1] |
   | b. Concentration of gasoline vapor at the exit of the first absorption column: | 10 mol % |
   | c. Concentration of gasoline vapor in a discharge gas (gas at the outlet of the second absorption column) ($y_o$): | 5 mol %[*2] |

[*1]: There was dispersion of 15 – 50 mol % in the actual operation.
[*2]: There was dispersion of 2.5 – 5 mol % in the actual operation.

d. Recovering ratio:

$$= (1 - \frac{100 - y_i}{100 - y_o} \times \frac{y_o}{y_i}) \times 100$$

$$= (1 - \frac{100 - 35}{100 - 5} \times \frac{5}{35}) \times 100$$

$$= 90.2\%$$

1-3 Operating conditions

| | At the time of recovering operations | At the time of regenerating operations |
|---|---|---|
| Pressure of the 1st absorption column | 1.8 kg/cm²G | 10 kg/cm²G |
| Temperature of the absorbent (gasoline) of the 1st absorption column | 2° C | 2° C |
| Pressure of the 2nd absorption column | 1.75 kg/cm²G | −500 mm Hg |
| Temperature of the absorbent (kerosene) of the 2nd absorption column | 10° C | 10° C |

It is understood that various other modifications will be apparent to and can readily be made by those skilled in the art without departing from the scope and spirit of this invention. Accordingly, it is not intended that the scope of the claims appended hereto be limited to the description set forth herein, but rather that the claims be construed as encompassing all the features which reside in the present invention, including all features which would be treated as equivalent thereof by those skilled in the art to which the invention pertains.

What is claimed is:

1. A process for recovering solvent vapor in an absorbing liquid and regenerating the absorbing liquid, comprising:
   (a) absorbing a solvent vapor in a cooled absorbing liquid to form an enriched cooled absorbing liquid;
   (b) desorbing a portion of solvent vapor from said enriched cooled absorbing liquid by warming said enriched cooled absorbing liquid, exposing said enriched absorbing liquid to a constant low vacuum regeneration stage and desorbing and recovering a portion of solvent vapor from said enriched absorbing liquid;
   (c) re-exposing said enriched absorbing liquid to said constant low vacuum regeneration stage and desorbing and recovering another portion of solvent vapor from said enriched absorbing liquid; and
   (d) repeatedly re-exposing said enriched absorbing liquid to said constant low vacuum regeneration stage and desorbing and recovering additional portions of solvent vapor from said enriched absorbing liquid thereby regenerating said absorbing liquid.

2. The process of claim 1, including repeating step (d) until absorbed solvent vapor is completely desorbed from said enriched absorbing liquid.

3. The process of claim 1, including repeating step (d) until 95% by weight of absorbed solvent vapor is desorbed from said enriched absorbing liquid.

4. The process of claim 1, including reabsorbing solvent vapors from step (b) and step (c) in a second absorbing liquid.

5. The process of claim 4, including reabsorbing said solvent vapors in a second absorbing liquid under greater than atmospheric pressure.

6. The process of claim 5, wherein said second absorbing liquid is cooled.

7. The process of claim 6, wherein said first and second absorbing liquids are hydrocarbons.

8. The process of claim 7, wherein said solvent vapor is selected from the group consisting of vapor of an aromatic hydrocarbon, an aliphatic hydrocarbon, a cycloaliphatic hydrocarbon and mixtures thereof.

9. The process of claim 8, wherein said solvent vapor is gasoline vapor and said second absorbing liquid is gasoline.

10. The process of claim 7, wherein said solvent vapor is selected from the group consisting of vapor of an alcohol, an ester, a ketone and mixtures thereof.

11. The process of claim 1, including in step (a) absorbing a solvent vapor in a cooled absorbing liquid under greater than atmospheric pressure to form an enriched cooled absorbing liquid.

12. The process of claim 11, including reabsorbing solvent vapors from step (b) and step (c) in a second absorbing liquid.

13. The process of claim 12, including reabsorbing solvent vapors from step (b) and step (c) in a second absorbing liquid under greater than atmospheric pressure.

* * * * *